(12) United States Patent
Laing

(10) Patent No.: US 7,392,955 B1
(45) Date of Patent: Jul. 1, 2008

(54) SYSTEM AND METHOD FOR TEMPERATURE CONTROL OF HOT-WATER SUPPLY SYSTEM

(76) Inventor: Karsten Laing, Theodor-Heuss-Strasse 29, 71566 Althutte (DE)

( * ) Notice: Subject to any disclaimer, the term of this patent is extended or adjusted under 35 U.S.C. 154(b) by 372 days.

(21) Appl. No.: 11/098,003

(22) Filed: Apr. 1, 2005

(51) Int. Cl.
*G05D 23/12* (2006.01)
*G05D 23/13* (2006.01)

(52) U.S. Cl. ............... 236/12.13; 236/12.18; 236/93 A; 236/100

(58) Field of Classification Search ............ 236/12.11, 236/12.13, 12.17, 12.18, 12.2, 99 J, 93 R, 236/93, 100, 93 A
See application file for complete search history.

(56) References Cited

U.S. PATENT DOCUMENTS

| | | | |
|---|---|---|---|
| 2,842,155 A | 7/1958 | Peters | |
| 6,536,464 B1 | 3/2003 | Lum et al. | |
| 6,929,187 B2 | 8/2005 | Kempf et al. | |
| 7,073,528 B2 | 7/2006 | Kempf et al. | |
| 7,140,382 B2 | 11/2006 | Kempf et al. | |
| 7,198,059 B2 | 4/2007 | Kempf et al. | |
| 2005/0242199 A1 | 11/2005 | Kempf et al. | |
| 2006/0049267 A1 | 3/2006 | Lum et al. | |
| 2007/0114290 A1 | 5/2007 | Kempf et al. | |
| 2007/0131783 A1 | 6/2007 | Kempf et al. | |
| 2007/0137709 A1 | 6/2007 | Kempf et al. | |

FOREIGN PATENT DOCUMENTS

| | | |
|---|---|---|
| AU | 7209298 | 10/1998 |
| DE | 29718257 | 7/1998 |
| DE | 19712051 | 9/1998 |
| DE | 19880372 | 11/2000 |
| DE | 59811478 | 7/2004 |
| EP | 0 751 355 | 1/1997 |
| EP | 1018063 B1 | 7/2000 |
| WO | WO 98/43143 | 10/1998 |

*Primary Examiner*—Marc E Norman
(74) *Attorney, Agent, or Firm*—Foley & Lardner LLP

(57) ABSTRACT

A valve assembly for providing hot water includes a hot water side with a hot water inlet and a cold water side. The valve assembly also includes a central channel for fluid communication between the cold water side and the hot water side and a bypass valve portion. The bypass valve portion includes a thermostatic valve adapted to substantially block the fluid communication through the central channel between the cold water side and the hot water side when a temperature of water flowing through the central channel increases above a threshold temperature. The bypass valve portion also includes a temperature adjustment portion adapted to selectively vary the threshold temperature.

10 Claims, 3 Drawing Sheets

SYSTEM AND METHOD FOR TEMPERATURE CONTROL OF HOT-WATER SUPPLY SYSTEM

BACKGROUND OF THE INVENTION

The present invention relates generally to the field of water supply systems. In particular, the invention relates to the control of temperature of a hot-water supply system.

In water supply systems installed in many homes, water is made available at one or more outlets, such as sinks, tubs, showers or appliances, through a cold water line and a hot water line. Typically, water enters the supply system from a source, such as a well or a water main, and is directed, on the one side, to a cold water line and, on the other side, to a water heater. Hot water from the water heater is then directed to a hot water line. The hot and cold water lines are then mixed at the outlet to provide water at a desired temperature.

In many systems, particularly those in large homes, hot water may not be immediately available at all outlets at all times. For example, water in the line between the water heater and an outlet may cool to room temperature overnight. Hot water does not become available at an outlet until the cooled water in the line is first drawn and wasted. This problem may be particularly apparent at an outlet that is furthest from the water heater. At such an outlet, the amount of cooled water that must be drawn before hot water becomes available may be quite large.

Systems to prevent such waste have been proposed. For example, U.S. Pat. No. 6,536,464, which is hereby incorporated by reference, proposes a thermostatically controlled bypass valve positioned within a tubular body between the hot water side and the cold water side. The valve opens a passage between the hot water side and the cold water side when the hot water is too cool. However, the bypass valve is positioned well within the tubular body and cannot be accessed for adjustment of the temperature at which the valve should close.

It is desirable to provide a means for controlling the temperature at which hot water is allowed to flow through an outlet.

SUMMARY OF THE INVENTION

One embodiment of the invention relates to a valve assembly for providing hot water. The valve assembly includes a hot water side with a hot water inlet and a cold water side. The valve assembly also includes a central channel for fluid communication between the cold water side and the hot water side and a bypass valve portion. The bypass valve portion includes a thermostatic valve adapted to substantially block the fluid communication through the central channel between the cold water side and the hot water side when a temperature of water flowing through the central channel increases above a threshold temperature. The bypass valve portion also includes a mechanical temperature adjustment portion adapted to selectively vary the threshold temperature.

DETAILED DESCRIPTION OF THE PREFERRED EMBODIMENTS

Figure 1:
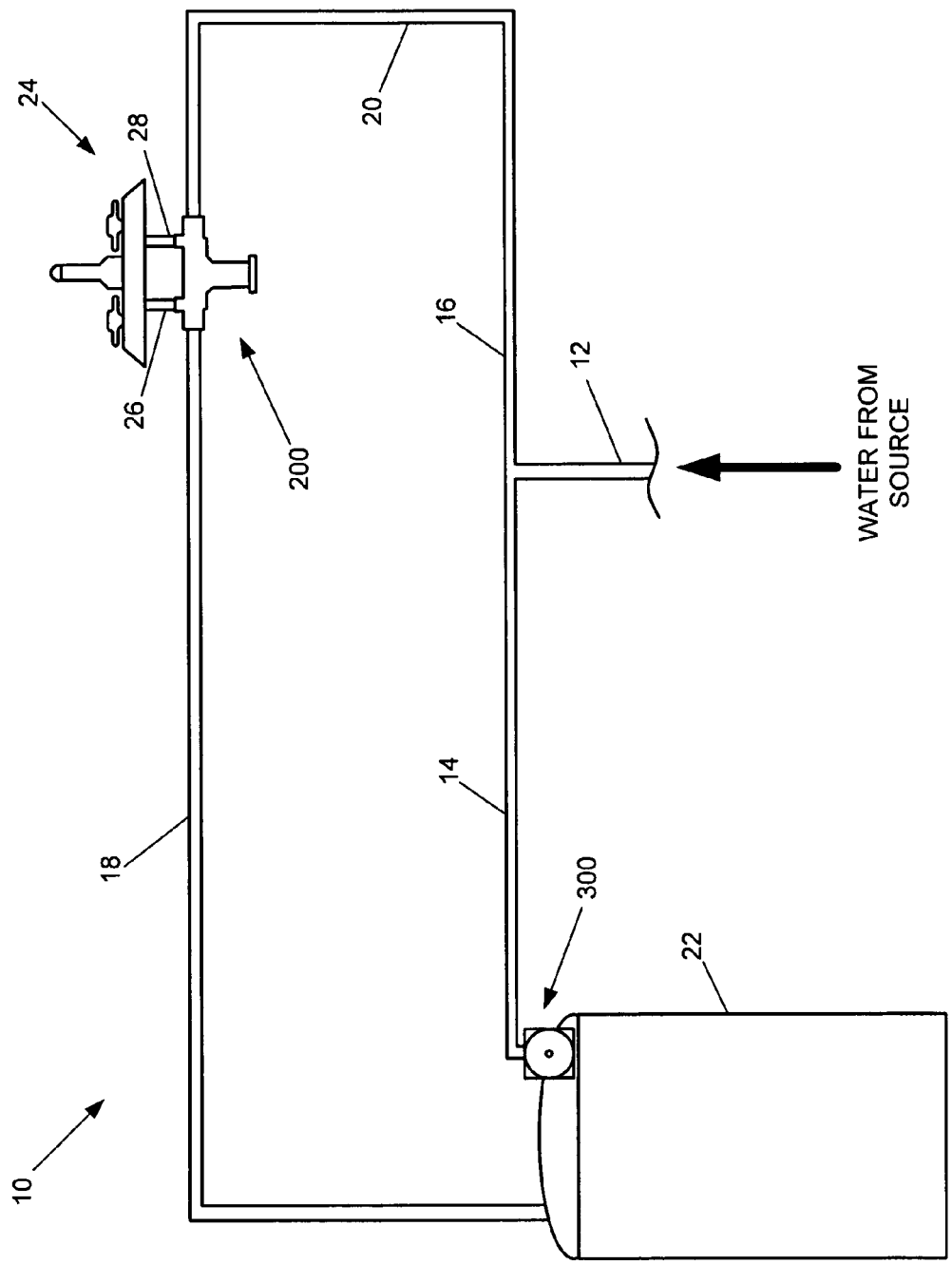
FIG. 1 is a schematic illustration of an embodiment of a water-supply system according to the present invention.

Referring to FIG. 1, a water supply system 10 according to an embodiment of the present invention is illustrated. The water supply system 10 may be installed in any house, building or other structure for providing water to one or more outlets, such as water outlet 24. The water outlet 24 may be a sink, a tub, a shower or the like. Although the water supply system 10 is illustrated with a single water outlet 24, it will be understood by those skilled in the art that additional water outlets may be positioned at various points of the water supply system 10.

The water supply system 10 receives water from a supply line 12 which directs water into the water supply system 10 from a source such as a well or a local water reservoir, for example. The water in the supply line 12 is then directed to a first branch 14 and a second branch 16.

Water in the first branch 14 is directed to a hot water system through a water heater 22, which heats the water to a desired temperature. The temperature of the hot water may be set using a dial or other control on the water heater 22. The heated water can then be drawn by the water outlet 24 through a hot water supply line 18 connecting the water heater 22 and the water outlet 24. A circulating pump assembly 300 is positioned on the first branch 14 between the supply line 12 and the water heater 22. The circulating pump assembly 300 is described in greater detail below with reference to FIGS. 4-6.

Cold water is supplied to the water outlet 24 through a cold water supply line 20 connected to the second branch 16, where it can be mixed with hot water from the hot water supply line 18.

The hot water supply line 18 and the cold water supply line 20 lead to a bypass valve assembly 200 positioned at the water outlet 24. A hot water connector 26 and a cold water connector 28 provide hot water and cold water, respectively, from the bypass valve assembly 200 to the water outlet 24, which may include controls, such as knobs, to control the amount and temperature of water drawn.

Figure 2:
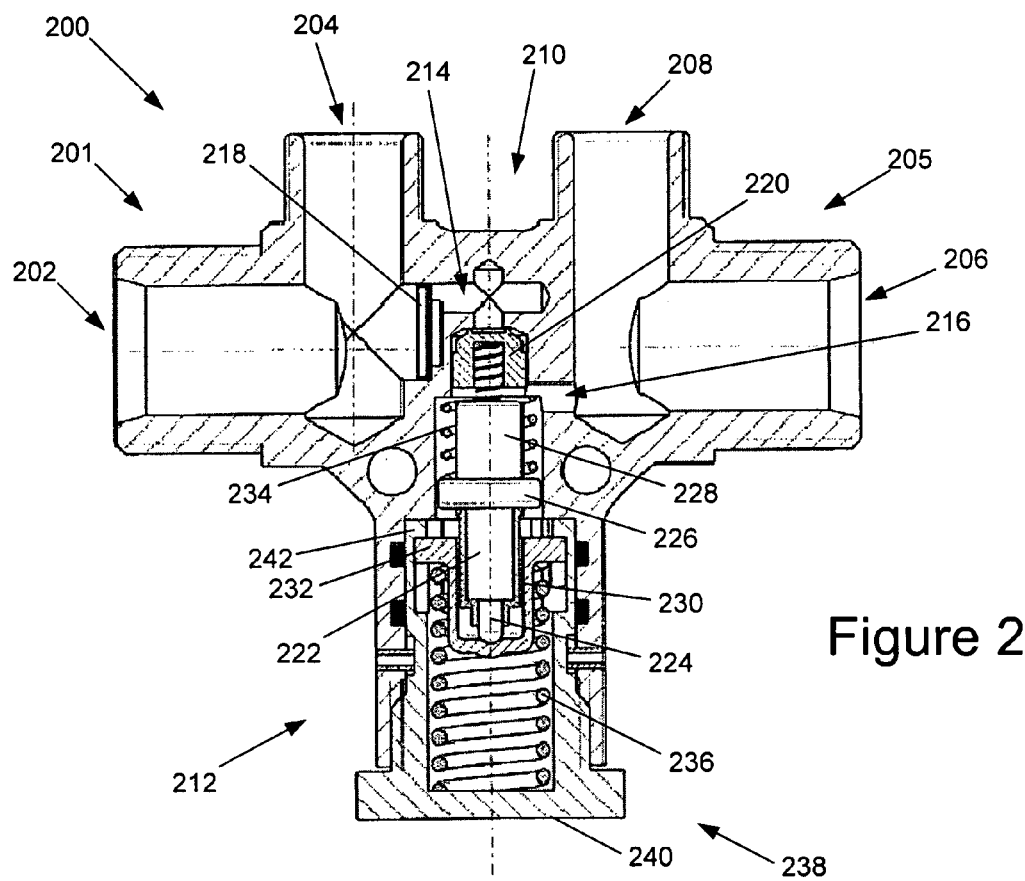
FIG. 2 is a cross-sectional illustration of a valve assembly according to an embodiment of the invention.
Figure 3:
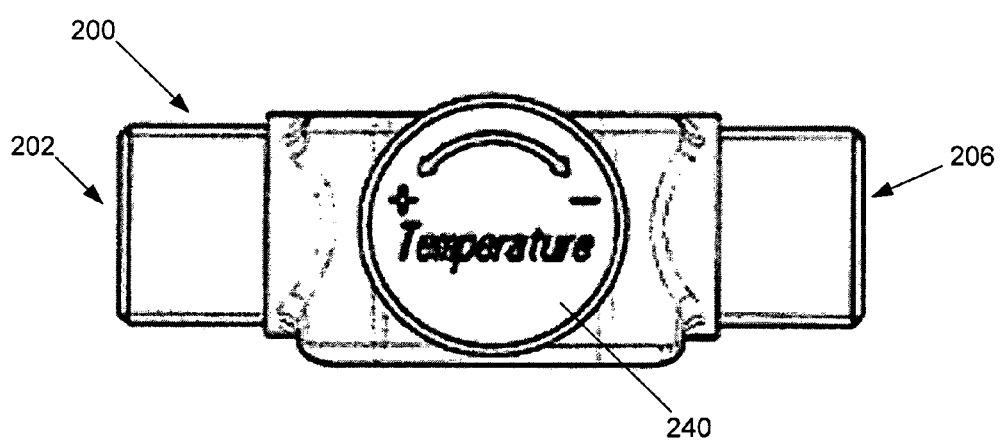
FIG. 3 is a front plan view of the valve assembly of FIG. 2.

Referring now to FIGS. 2 and 3, an embodiment of the bypass valve assembly is illustrated. The bypass valve assembly 200 includes a hot water side 201 and a cold water side 205. The hot water side 201 includes a hot water inlet 202 and a hot water outlet 204. The hot water inlet 202 is adapted to receive water from the water heater 22 through the hot water supply line 18 (FIG. 1). The hot water outlet 204 directs water to a water outlet, such as water outlet 24 shown in FIG. 1.

Similarly, the cold water side 205 of the illustrated embodiment of the bypass valve assembly 200 includes a cold water inlet 206 and a cold water outlet 208. The cold water inlet 206 is adapted to receive water from the cold water supply line 20, and the cold water outlet 208 directs water to the water outlet 24 (FIG. 1).

The hot water side 201 and the cold water side 205 are separated by a central portion 210 of the bypass valve assembly 200. A central channel 214, 216 is provided through the central portion 210 for fluid communication between the hot water side 201 and the cold water side 205.

A bypass valve portion 212 is positioned substantially perpendicular to an axis formed by the hot water inlet 202 and the cold water inlet 206 and aligned with the central portion 210. A thermostatic valve 222 is positioned within the bypass valve portion 212. The thermostatic valve 222 has a thermally sensitive valve body 228 which is adapted to actuate a piston 224. With increasing temperature of the thermally sensitive valve body 228, the piston 224 is extended further.

The thermostatic valve 222 is provided with a large diameter section 226 which secures a bias spring 234 around the thermally sensitive valve body 228. Thus, one end of the bias spring 234 is forced against a surface of the large diameter section 226, while the other end is positioned around an opening of the central channel 214, 216 in the central portion 210.

A piston cap 230 is positioned around the piston 224 and around a portion of the thermostatic valve 222. The piston cap 230 includes an annular flange 232 extending outward from the thermostatic valve 222. The annular flange 232 provides a base for one end of an over-travel spring 236.

Thus, in operation, during extended periods of non-use, the water on the hot water side may cool down together with the thermally sensitive valve body 228. The cooling of the thermally sensitive valve body 228 causes the piston 224 to move to a retracted position. With the piston 224 in the retracted position, the bias spring 234 forces the large diameter section 226 and the thermally sensitive valve body 228 away from the central channel 214, 216, and fluid communication between the hot water side 201 and the cold water side 205 is allowed through the central channel 214, 216. A pressure differential between the hot water side 201 and the cold water side 205 created by the circulation pump assembly 300 (FIG. 1) causes the cooled water to flow through the central channel 214, 216.

Further, a check valve 220 is provided within the central channel 214, 216 to prevent backward flow from the cold water side 205 to the hot water side 201. A screen 218 is provided at the hot water side of the central channel 214, 216 to prevent contaminants from entering and clogging the bypass valve portion 212. The screen 218 may be adapted to be cleaned by the cooled water flowing therethrough.

As the water flowing through the central channel 214, 216 begins to increase in temperature, the temperature of the thermally sensitive valve body 228 increases, causing the piston 224 to extend outward. The extension of the piston 224 acts against the force of the bias spring 234 and causes the thermostatic valve 222 to be forced toward the central channel 214, 216. When the temperature of the water reaches a threshold temperature, the piston 224 extends sufficiently to cause the thermally sensitive valve body 228 to block the central channel 214, 216, thereby blocking fluid communication between the hot water side 201 and the cold water side 205. When a user attempts to hot draw water, water is then directed to the hot water outlet 204 at a temperature that is at or above the threshold temperature.

The bypass valve portion 212 also includes a temperature adjustment portion 238 to allow variation of the threshold temperature at which the central channel 214, 216 is blocked. In the embodiment illustrated in FIGS. 2 and 3, the temperature adjustment portion 238 is mechanical and includes a valve adjustment dial 240 with a cavity inside for accommodating the over-travel spring 236 and the piston cap 230. The valve adjustment dial 240 also includes an inward flange 242 which engages the annular flange 232 of the piston cap 230 and secures the piston cap 230 within the cavity.

Thus, if the valve adjustment dial 240 is moved inward, as may be achieved by turning the valve adjustment dial 240 clockwise, the piston cap 230 is also moved inward, resulting in a decrease in the distance between the piston cap 230 and the central channel 214, 216. In turn, the amount of extension of the piston 224 required to block the central channel 214, 216 is reduced. Thus, the threshold temperature at which the central channel 214, 216 is blocked and water is directed to the hot water outlet 204 is also reduced.

Conversely, if the valve adjustment dial 240 is moved outward, as may be achieved by turning the valve adjustment dial 240 counterclockwise, the piston cap 230 is also moved outward, resulting in an increase in the distance between the piston cap 230 and the central channel 214, 216. In turn, the amount of extension of the piston 224 required to block the central channel 214, 216 is increased. Thus, the threshold temperature at which the central channel 214, 216 is blocked and water is directed to the hot water outlet 204 is also increased.

Thus, a user may be provided with an easily accessible means for adjusting the temperature at which water from the hot water side will flow from the outlet. Since the cooled water is bypassed to the cold water side, waste of water is significantly reduced or eliminated.

As noted above, in order to direct water from the hot water side 201 to the cold water side 205 through the central channel 214, 216, a pressure differential may be required between the hot water side 201 and the cold water side 205. In this regard, a circulation pump assembly 300 may be provided, as illustrated in FIG. 1.

Figure 4:
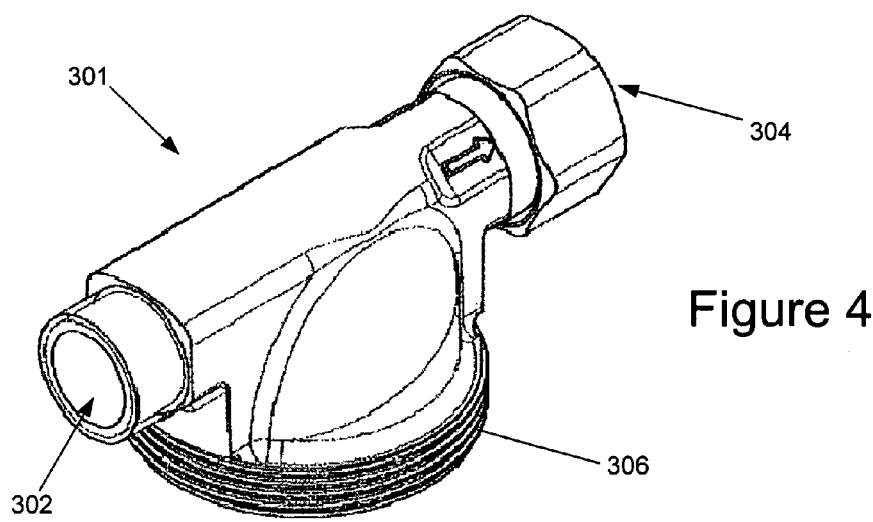
FIG. 4 illustrates a perspective view of a circulating pump adapter for use with the water-supply system of FIG. 1.
Figure 5:
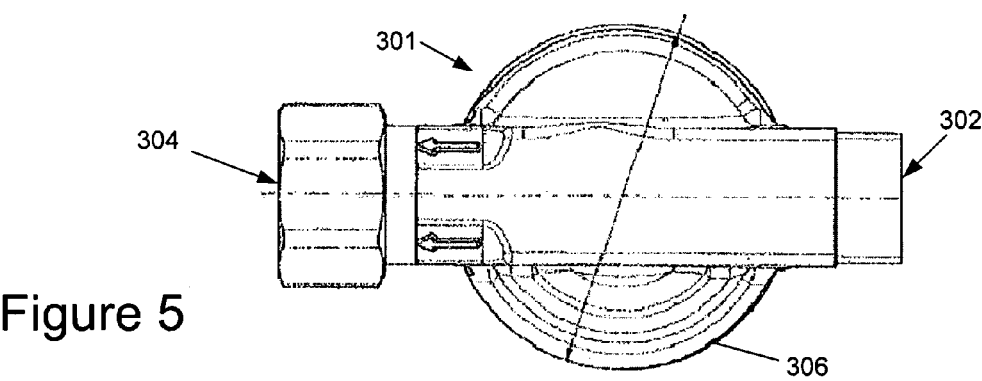
FIG. 5 is a top plan view of the circulating pump adapter of FIG. 4.
Figure 6:
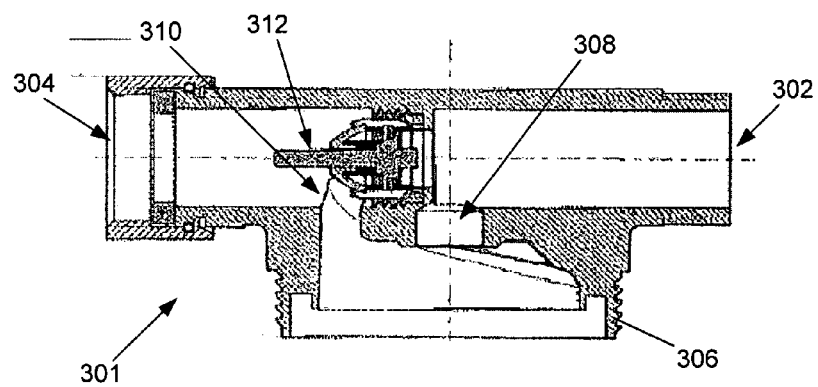
FIG. 6 is a cross-sectional illustration of the circulating pump adapter of FIGS. 4 and 5.

An embodiment of a circulating pump adapter 301, which may be a part of the circulation pump assembly 300, is illustrated in FIGS. 4-6. The circulating pump adapter 301 includes an inlet 302 and an outlet 304 for the cold water from the first branch 14 shown in FIG. 1. The inlet 302 engages the first branch 14, while the outlet 304 may be connected directly to the water heater 22, shown in FIG. 1. The circulating pump adapter 301 also includes a threaded pump mount 306 upon which a circulation pump (not shown) can be installed. The circulation pump to be installed may be a small, low-capacity pump to provide a pressure differential sufficient to direct flow through the central channel 214, 216 from the hot water side 201 to the cold water side 205. In one embodiment, a pressure differential of 3 psi is generated by the circulation pump.

As shown in FIG. 6, the circulating pump adapter 301 includes a pump inlet 308 to direct water from the inlet 302 to the pump. Further, a pump outlet 310 is provided to direct water from the pump to the outlet 304. A check valve 312 is provided to allow water to bypass the circulation pump. For example, when water is being drawn through a water outlet, such as outlet 24 of FIG. 1, the amount of water passing through the circulation pump assembly may significantly exceed the capacity of the circulation pump. In this regard, the check valve 312 allows water to bypass the circulation pump to prevent damage to the circulation pump.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A valve assembly for providing hot water, comprising:
a hot water side with a hot water inlet;
a cold water side;
a central channel for fluid communication between the cold water side and the hot water side; and a bypass valve portion, the bypass valve portion comprising:
  a thermostatic valve adapted to substantially block the fluid communication through the central channel between the cold water side and the hot water side when a temperature of water flowing through the central channel increases above a threshold temperature; and
  a mechanical temperature adjustment portion adapted to selectively vary the threshold temperature,
wherein the thermostatic valve includes a thermally sensitive valve body and a piston adapted to extend outward from the thermally sensitive valve body with increasing temperature, and
wherein the mechanical temperature adjustment portion is adapted to adjust an amount of extension of the piston required to cause the thermostatic valve to substantially block the fluid communication through the central channel.

2. The valve assembly of claim 1, wherein the mechanical temperature adjustment portion is adapted to translate along an axis of the piston.

3. The valve assembly of claim 2, wherein the mechanical temperature adjustment portion includes a rotatable dial, a rotation of the dial being adapted to cause translation along the axis of the piston.

4. A valve assembly for providing hot water, comprising:
a hot water side with a hot water inlet;
a cold water side;
a central channel for fluid communication between the cold water side and the hot water side; and
a bypass valve portion, the bypass valve portion comprising:
  a thermostatic valve adapted to substantially block the fluid communication through the central channel between the cold water side and the hot water side when a temperature of water flowing through the central channel increases above a threshold temperature; and
  a mechanical temperature adjustment portion adapted to selectively vary the threshold temperature,
wherein the mechanical temperature adjustment portion is adapted to translate along an axis of the thermostatic valve.

5. The valve assembly of claim 4, wherein the mechanical temperature adjustment portion includes a rotatable dial, a rotation of the dial being adapted to cause translation along the axis of the piston.

6. A water supply system comprising:
a water outlet for providing hot water and cold water to a user;
a water heater for supplying hot water to the water outlet;
a cold water source for supplying cold water to the water outlet and to the water heater;
a circulation pump assembly mounted between the cold water source and the water heater; and
a valve assembly mounted at the water outlets the valve assembly comprising:
  a hot water side with a hot water inlet for receiving water from the water heater and a hot water outlet for providing water to the water outlet;
  a cold water side with a cold water inlet interconnected to the cold water source;
  a central channel for fluid communication between the cold water side and the hot water side; and
  a bypass valve portions the bypass valve portion comprising:
    a thermostatic valve adapted to substantially block the fluid communication through the central channel between the cold water side and the hot water side when a temperature of water flowing through the central channel increases above a threshold temperature; and
    a mechanical temperature adjustment portion adapted to selectively vary the threshold temperature,
  wherein the thermostatic valve includes a thermally sensitive valve body and a piston adapted to extend outward from the thermally sensitive valve body with increasing temperature, and
  wherein the mechanical temperature adjustment portion is adapted to adjust an amount of extension of the piston required to cause the thermostatic valve to substantially block the fluid communication through the central channel.

7. The water supply system of claim 6, wherein the mechanical temperature adjustment portion is adapted to translate along an axis of the piston.

8. The water supply system of claim 7, wherein the mechanical temperature adjustment portion includes a rotatable dial, a rotation of the dial being adapted to cause translation along the axis of the piston.

9. A water supply system comprising:
a water outlet for providing hot water and cold water to a user;
a water heater for supplying hot water to the water outlet;
a cold water source for supplying cold water to the water outlet and to the water heater;
a circulation pump assembly mounted between the cold water source and the water heater; and
a valve assembly mounted at the water outlet, the valve assembly comprising:
  a hot water side with a hot water inlet for receiving water from the water heater and a hot water outlet for providing water to the water outlet;
  a cold water side with a cold water inlet interconnected to the cold water source;
  a central channel for fluid communication between the cold water side and the hot water side; and
  a bypass valve portion, the bypass valve portion comprising:
    a thermostatic valve adapted to substantially block the fluid communication through the central channel between the cold water side and the hot water side when a temperature of water flowing through the central channel increases above a threshold temperature; and
    a mechanical temperature adjustment portion adapted to selectively vary the threshold temperature,
  wherein the mechanical temperature adjustment portion is adapted to translate along an axis of the thermostatic valve.

10. The water supply system of claim 9, wherein the mechanical temperature adjustment portion includes a rotatable dial, a rotation of the dial being adapted to cause translation along the axis of the piston.

* * * * *